United States Patent [19]

Kim

[11] Patent Number: 5,539,580
[45] Date of Patent: Jul. 23, 1996

[54] PROJECTION OPTICAL SYSTEM FOR A LIQUID CRYSTAL PROJECTOR

[75] Inventor: Hoo-shik Kim, Suwon, Rep. of Korea

[73] Assignee: Samsung Aerospace Industries, Ltd., Changwon, Rep. of Korea

[21] Appl. No.: 349,983

[22] Filed: Dec. 6, 1994

[30] Foreign Application Priority Data

Mar. 28, 1994 [KR] Rep. of Korea .................. 94-6231

[51] Int. Cl.⁶ .................................................. G02B 3/00
[52] U.S. Cl. ............................................ 359/649; 359/756
[58] Field of Search .............................. 359/649, 650, 359/755, 756, 757, 761, 762, 793, 794, 795

[56] References Cited

FOREIGN PATENT DOCUMENTS 6057311  4/1985  Japan ............................ 359/756

Primary Examiner—Georgia Y. Epps
Assistant Examiner—Dawn-Marie Bey
Attorney, Agent, or Firm—Morgan & Finnegan

[57] ABSTRACT

A projection optical system for a liquid crystal projector having a plurality of lenses and projecting an image from liquid crystal display devices onto a screen including a front lens portion having a meniscus lens, a first concave lens, a convex lens and a second concave lens sequentially arranged from the furthermost of an image plane. A rear lens portion is also provided having two plano-convex lenses positioned between the front lens portion and image plane (display screen), with the flat surfaces thereof facing the image plane. The projection optical system for a liquid crystal projector having a compact size and capable of projecting focused images on the screen by adjusting the distance between the front and rear lens portions.

6 Claims, 5 Drawing Sheets

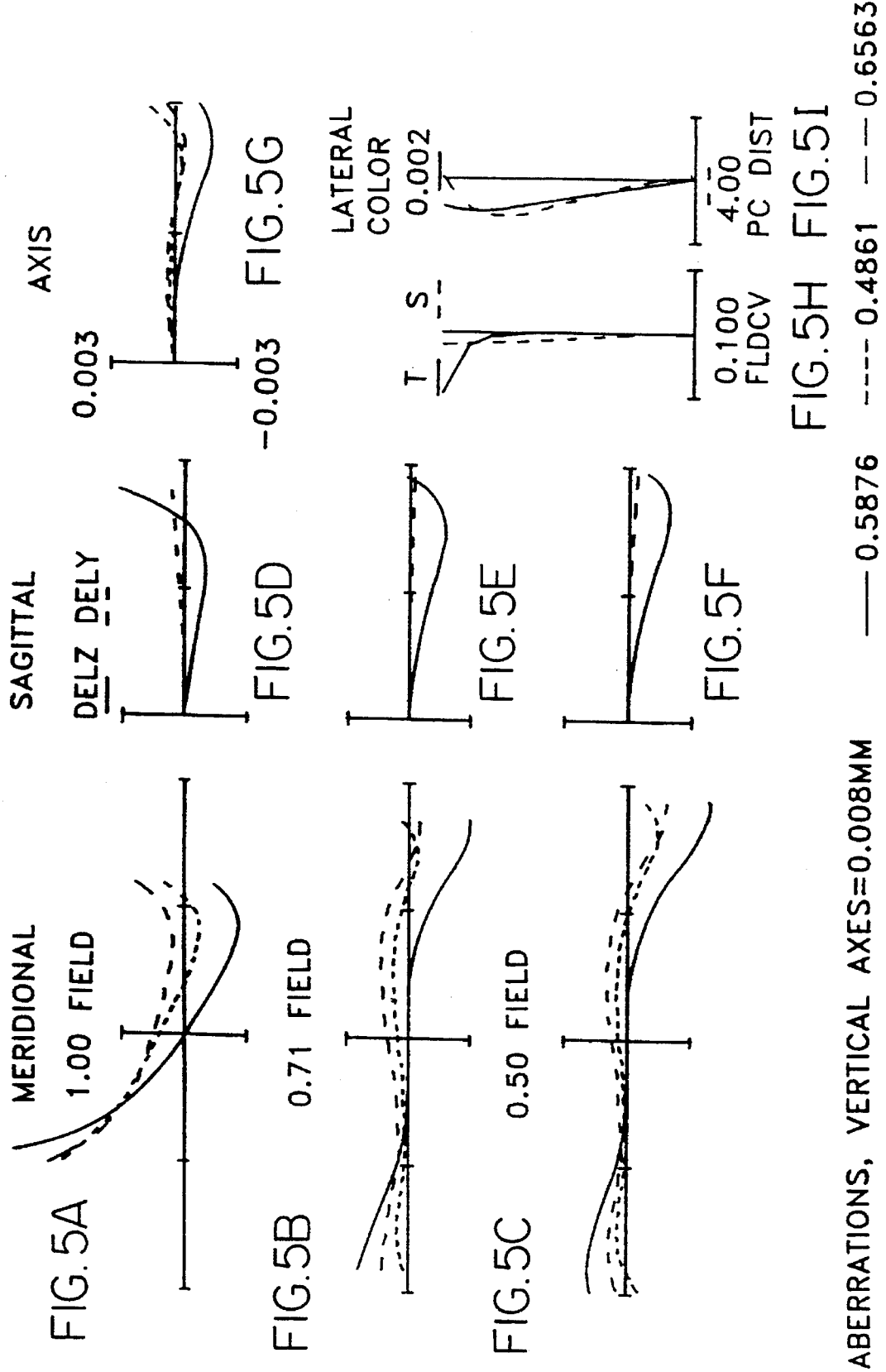

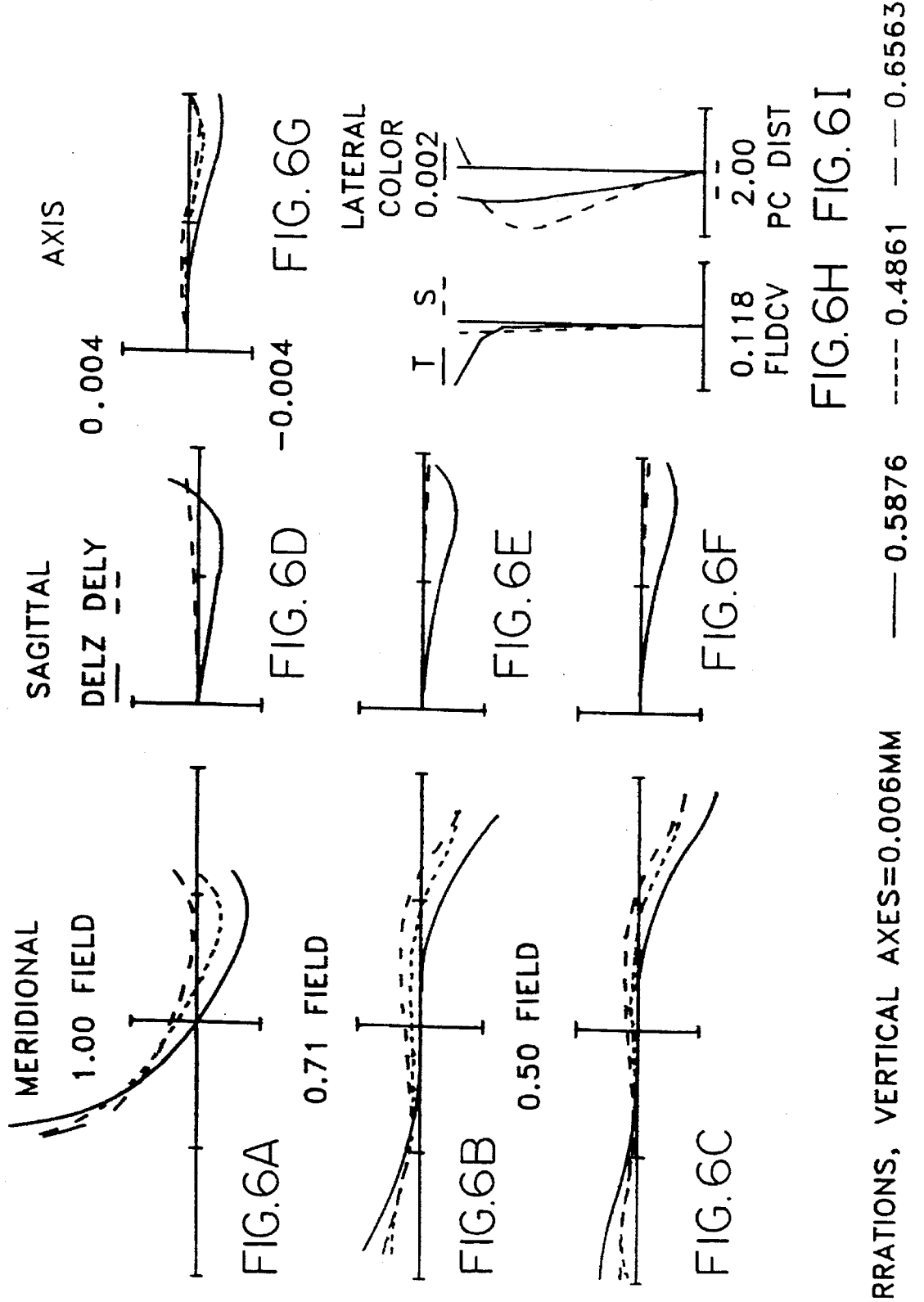

PROJECTION OPTICAL SYSTEM FOR A LIQUID CRYSTAL PROJECTOR

BACKGROUND OF THE INVENTION

The present invention relates to a projection optical system for a liquid crystal projector for projecting a picture displayed on a liquid crystal display (LCD) panel onto a large screen, and more particularly, to a projection optical system for a liquid crystal projector whose volume is significantly reduced in terms of lens diameter and thickness, so that the manufacturing cost can be saved.

Recently, with the advent of semiconductor integration technology, high density integration has been successively achieved, so that liquid crystal displays have seen wider use (especially in the field of small portable liquid crystal televisions) which have not experienced serious problems as to their application and manufacture. However, as for large-screen television displays, a thin film transistor liquid crystal display (TFT LCD) using a twisted nematic liquid crystal as a light controlling material, and a TFT as a switching element of pixels, requires a quite difficult manufacturing process. Moreover, the larger the TFT LCD becomes, the less the yield becomes. Therefore, there is a limit in attaining a large screen with a TFT LCD. Accordingly, in order to obtain a large screen with a TFT LCD, the TFT LCD is adopted to a projector by which the large screen can be attained easily, as an image processor for controlling the light incident from a light source by an electrical image signal.

FIG.1 shows a schematic diagram of a projection optical system for a conventional liquid crystal projector composed of multiple lenses. Also, FIG.2 schematically shows the arrangement structure of optical units of a conventional liquid crystal projector.

To ensure the proper distance between a lens arrangement 30 and the screen, the conventional liquid crystal projector should be in the form of a retrofocus optical system in which a "back focal" length, i.e., from the final lens surface ($R_{13}$) of the lens arrangement to the screen, is relatively long.

As shown in FIG. 1, the projection optical system for the conventional liquid crystal projector has six lenses in total. Here, a first lens is a plano-convex lens having both surfaces whose curvature radii are $R_1$ and $R_2$, respectively, and a second lens is a meniscus lens having both surfaces whose curvature radii are $R_3$ and $R_4$, respectively. The first and second lenses form a front lens portion 31. A third lens is a concave lens whose curvature radii are $R_6$ and $R_7$, a fourth lens is a convex lens having both surfaces whose curvature radii are $R_8$ and $R_9$, a fifth lens is a convex lens whose curvature radii are $R_{10}$ and $R_{11}$, and a sixth lens is a convex lens having both surfaces whose curvature radii are $R_{12}$ and $R_{13}$, respectively. The third to sixth lenses form a rear lens portion 32. A 20 is provided between the front lens portion 31 and the rear lens portion 32.

Referring to FIG.2, a projection optical system 30 is provided in front of a light emitting surface 46a of a prism 46 having dichroic filters 46c and 46d intersecting with each other by an angle of 45°. Three LCDs 48a, 48b and 48c are provided in front of three light incident surfaces 46g, 46b and 46r, respectively. Red, green and blue beams obtained from a light source 41 are incident to the LCDs 48a, 48b and 48c, respectively. In front of the light source 41, an infrared filter 44a for filtering infrared rays from among the beams projected therefrom is provided. A first dichroic mirror 44b for screening and reflecting the green beam from among traveling light is provided in front of the infrared filter 44a. A first total reflector 42a for reflecting the green beam onto the green LCD 48a is provided in the traveling path of the green beam. A second dichroic mirror 44c for reflecting the blue beam onto the blue LCD 48b is provided in the traveling path of the beam transmitted via the first dichroic mirror 44b, i.e., the red beam. Also, second and third total reflectors 42b and 42c for reflecting the red beam onto the red LCD 48c is provided in the traveling path of the light beam transmitted via the second dichroic mirror 44c, i.e., the red and blue mixed beam.

In the prior art as described above, in view of the characteristics of the above liquid crystal projector, a greater contrast between the brightness of the projected image and the room illumination is often necessary. In addition, since the overall optical system constituting such a projector is necessarily a telecentric optical system, the effective diameter of rear lens portion 32 increases, which is a disadvantage in that a size reduction is difficult to achieve due to the larger lens size.

Now, the lens configuration in the conventional projection optical system will be described with reference to FIG. 1.

The first through fifth lenses having curvature radii $R_1$ through $R_{11}$ of the first five lenses, have symmetric Gaussian forms, and more particularly, have a configuration of a telecentric optical system. Also, stop 20 is placed between the front lens portion 31 and rear lens portion 32.

Also, a retrofocus type lens form is required so that a longer back focal length can be attained, and therefore the third convex lens is added (curvature radii $R_{12}$ and $R_{13}$) which causes a degree of dissymmetry in the Petzval sum. Consequently, curvature radii $R_4$ and $R_6$ are slightly different from those of lenses satisfying the conventional Gaussian form.

However, in achieving the above requirement (i.e., the retrofocus type lens form), another problem arises in that the lens diameter of rear lens portion 32 becomes greater. Also, since the back focal length is longer in such an optical system, the length of liquid crystal projector 30 is accordingly longer. Larger projectors lead to an inevitable rise in the manufacturing cost thereof.

Moreover, the focusing of the above-described liquid crystal projector is adjusted by varying a dimension $D_{13}$. However, if the overall optical system is installed in a tube, it becomes necessarily difficult to manufacture and transport the resultingly large tube.

SUMMARY OF THE INVENTION

To solve the above and other problems, it is an object of the present invention to provide a projection optical system for a liquid crystal projector, which has a compact volume and exhibits better focusing performance.

To accomplish the above and other objects, the projection optical system of a liquid crystal projector according to the present invention includes a front lens portion having a meniscus lens, a first concave lens, a convex lens and a second concave lens sequentially arranged from the furthermost part of an image plane. The present invention also includes a rear lens portion composed of two plano-convex lenses positioned between the front lens portion and an image plane, with the flat surfaces of the plano-convex lenses facing the image plane.

BRIEF DESCRIPTION OF THE DRAWINGS

The above objects and other advantages of the present invention will become more apparent by describing in detail a preferred embodiment thereof with reference to the attached drawings in which:

FIG. 5 shows aberration characteristics in connection with an embodiment of the present invention; and FIG. 6 shows aberration characteristics in connection with another embodiment of the present invention.

DETAILED DESCRIPTION OF THE INVENTION

Figure 1:
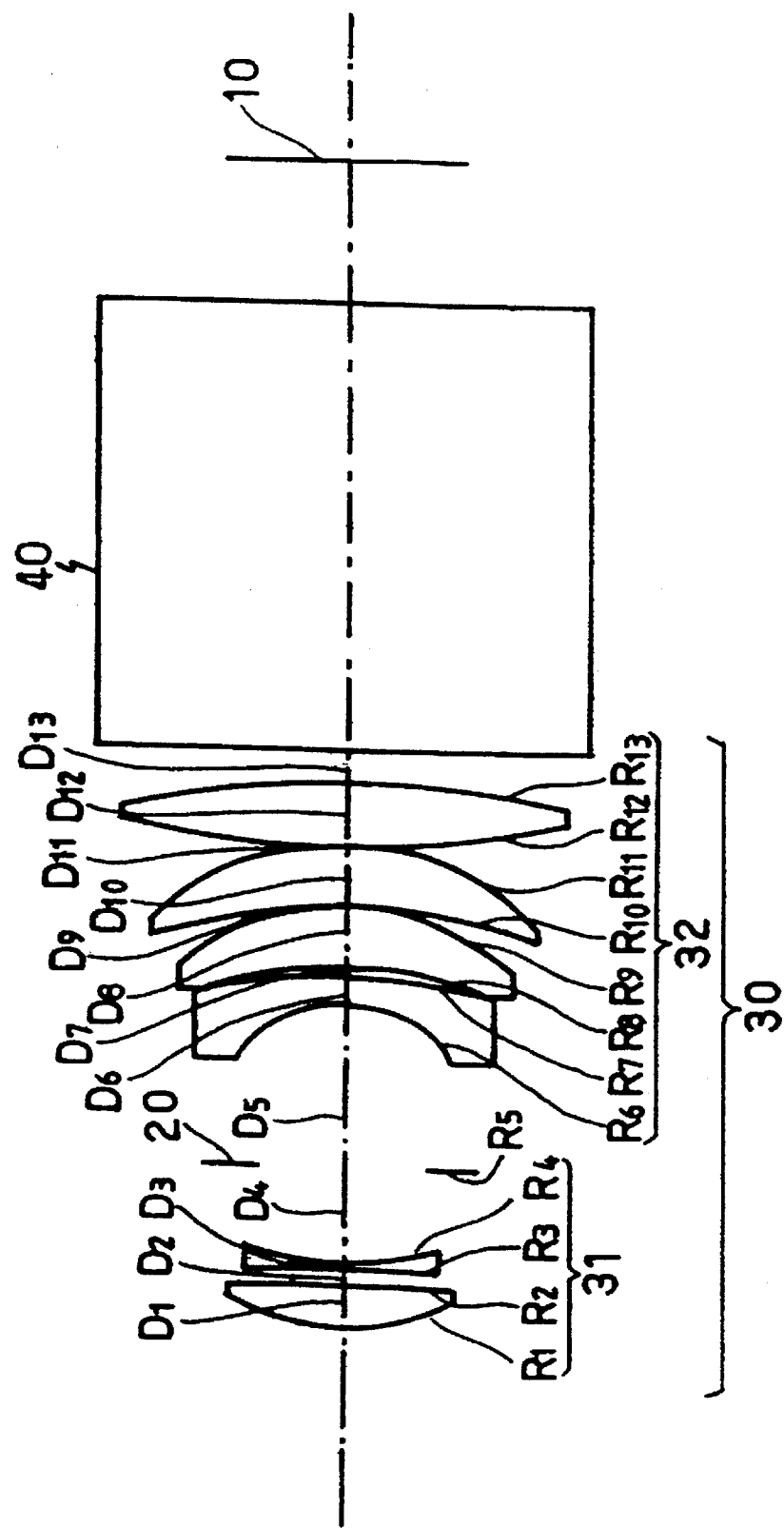
FIG. 1 is a schematic diagram of projection optical system for a conventional liquid crystal projector composed of multiple lenses.
Figure 2:
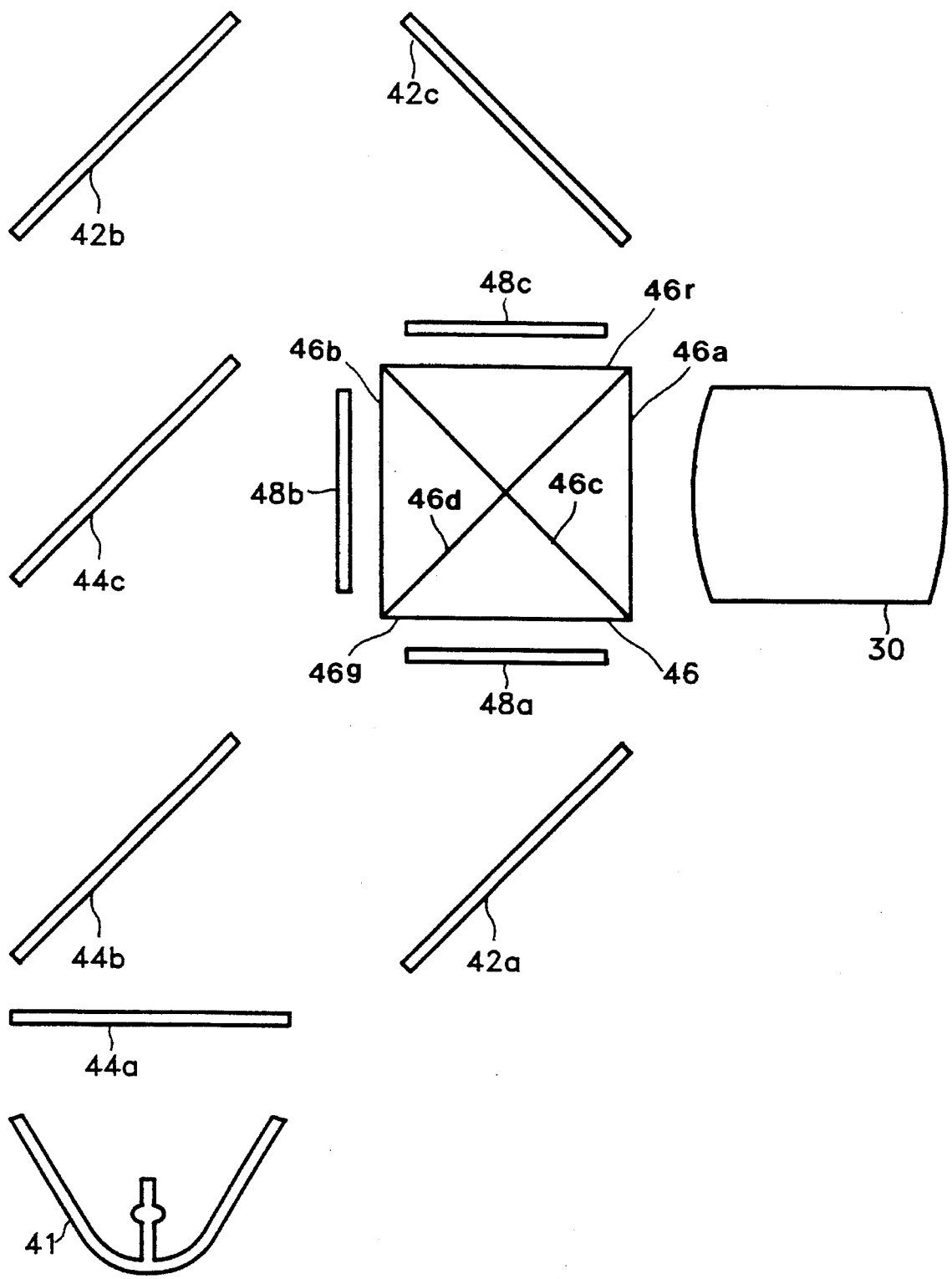
FIG. 2 schematically shows the arrangement structure of optical units of a conventional liquid crystal projector.
Figure 3:
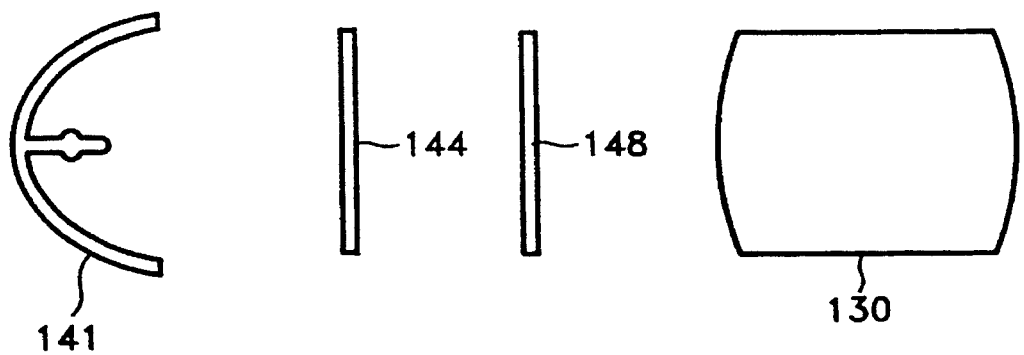
FIG. 3 shows a schematic configuration of the liquid crystal projector according to the present invention.

FIG. 3 shows a schematic diagram of the liquid crystal projector adopting a single panel type color LCD having red, green and blue pixels in a body. Referring to FIG. 3, a light source 141, an infrared filter 144, a color LCD 148 and a projection optical system 130 are provided in the same light beam traveling axis. Therefore, the liquid crystal projector having the aforementioned configuration no longer requires the mirrors of the conventional projector as shown in FIG. 2, so that the color mixing dichroic prism 46 is also unnecessary.

A single panel type LCD, as described above, has a simpler structure than the conventional projector having three sheets of LCDs shown in FIG. 2, and thus can be manufactured much more compactly. Also, since the distance between color LCD 148 and light source 141 is reduced, the overall length of the projector can be shortened.

Figure 4:
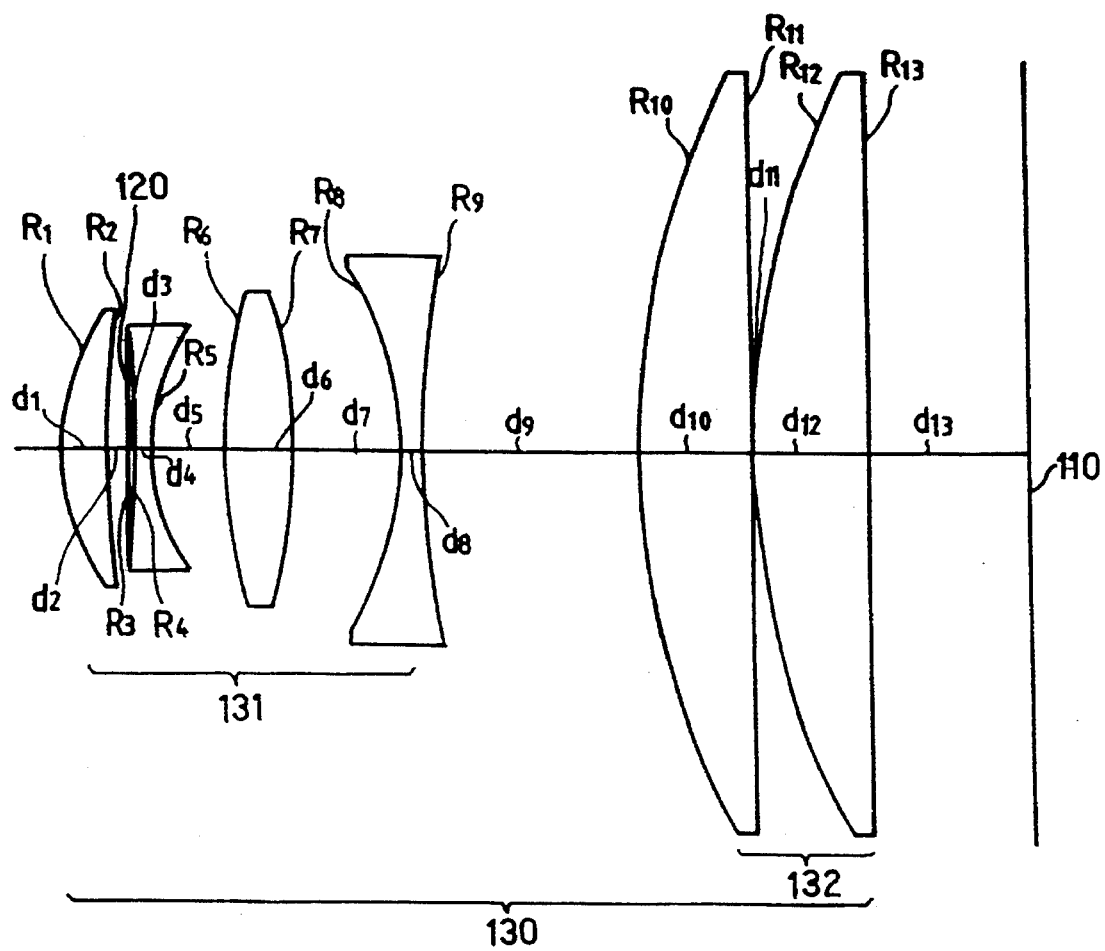
FIG. 4 shows a schematic configuration of the projection optical system of the liquid crystal projector according to the present invention.

FIG. 4 shows a lens configuration of the projection optical system for a liquid crystal projector according to a preferred embodiment of the present invention. Here, the optical system has six lenses in total. A first lens is a meniscus lens having both surfaces whose curvature radii are $R_1$ and $R_2$, respectively, a second lens is a concave lens having both surfaces whose curvature radii are $R_4$ and $R_5$, respectively, a third lens is a convex lens whose curvature radii are $R_6$ and $R_7$, respectively, and a fourth lens is a concave lens having both surfaces whose curvature radii are $R_8$ and $R_9$, respectively. The first to fourth lenses form a front lens portion 131.

Also, a fifth lens is a plano-convex lens having both surfaces whose curvature radii are $R_{10}$ and $R_{11}$, respectively, and a sixth lens is a plano-convex lens having both surfaces whose curvature radii are $R_{12}$ and $R_{13}$, respectively. The fifth and sixth lenses form a rear lens portion 132.

For a projection optical system to have a shortened length while maintaining the liquid crystal projector's telecentric characteristics, the back focal length ($d_{13}$) and the distance between stop 120 (whose curvature radius is $R_3$) and the lens surface having curvature radius $R_{13}$ should both be shortened. A telecentric type optical system is adopted in front lens portion 131 to reduce the length of the projection optical system. Also, to compensate for the enlargement of the divergence angle of the lens surface having curvature radius $R_9$, and thereby to make the light beams perpendicularly incident to screen 110, convex lenses having a strong positive vergence are used as each member of the rear lens portion 132.

According to the projection optical system for a liquid crystal projector having the above-described lens components, aberrations thereof can be effectively compensated by considering certain design specifications. First of all, as for the first and third lenses (from the input side of the lens arrangement 130 as shown in FIG. 4), a material showing the characteristics of high refraction and low dispersion is used, so that the Petzval sum symmetry and color aberration can be significantly improved. Next, although it is known that the longer the distance between the third lens and the fourth lens is the more advantageous it is in compensating the Petzval sum and correcting astigmatism, the lens tube must be made longer and each lens should have a larger diameter in order to accommodate this increased distance. For such a reason, the distance between the third lens and the fourth lens should be set at a proper value.

Finally, the large Petzval sum caused by the third, fifth and sixth lenses are cancelled at the lens surfaces having curvature radii $R_5$ and $R_8$.

Also, since focusing is difficult when all the lens components are movable, it is preferable to separately correct the aberrations of the front lens portion and the rear lens portion, so that focusing can be achieved by merely varying dimension $d_9$. By doing so, focusing readjustment, which may be necessary whenever the projection distance is varied, can be performed with relative ease, and cost savings can be realized for tube manufacturing.

In the preferred embodiments according to the present invention, since the fifth and sixth lenses have large diameters, plano-convex lenses are adopted as the fifth and sixth lenses, in which surfaces having curvature radii $R_{11}$ and $R_{13}$ are made flat to facilitate the fixing thereof.

Meanwhile, the feature that one surface of the lens is made flat, can also provide a smaller gap between the lenses of rear lens portion 132 when rear lens portion 132 is separated from front lens portion 131.

Table 1 shows data representing the lens specifications of the projection optical system for a liquid crystal projector according to a preferred embodiment of the present invention. Here, $n_1 \sim n_{12}$ indicate the refraction ratios of the respective lens materials and $v_1 \sim v_{12}$ are the corresponding Abbe numbers.

TABLE 1

| curvature radius | air interval | refraction ratio | Abbe number |
|---|---|---|---|
| $R_1 = 0.290$ | $d_1 = 0.0637$ | $n_1 = 1.776$ | $v_1 = 49.9$ |
| $R_2 = 1.213$ | $d_2 = 0.0278$ | | |
| $R_3 = \infty$ | $d_3 = 0.0069$ | | |
| $R_4 = -2.341$ | $d_4 = 0.0255$ | $n_4 = 1.694$ | $v_2 = 31.4$ |
| $R_5 = 0.275$ | $d_5 = 0.0931$ | | |
| $R_6 = 0.700$ | $d_6 = 0.0882$ | $n_6 = 1.808$ | $v_6 = 46.7$ |
| $R_7 = -0.700$ | $d_7 = 0.0412$ | | |
| $R_8 = -0.416$ | $d_8 = 0.0294$ | $n_8 = 1.543$ | $v_8 = 47.3$ |
| $R_9 = 1.202$ | $d_9 = 0.2794$ | | |
| $R_{10} = 1.043$ | $d_{10} = 0.1471$ | $n_{10} = 1.519$ | $v_{10} = 64.4$ |
| $R_{11} = \infty$ | $d_{11} = 0.0020$ | | |
| $R_{12} = 1.043$ | $d_{12} = 0.1471$ | $n_{12} = 1.519$ | $v_{12} = 64.4$ |
| $R_{13} = \infty$ | $d_{13} = 0.1979$ | | |

Here, assuming that the effective focal length of the whole optical system 130 is one, the total distance from the lens surface having curvature radius $R_1$ to screen 110 is 1.249.

On the other hand, Table 2 shows the lens specifications of the projection optical system for a liquid crystal projector according to a second preferred embodiment of the present invention.

TABLE 2

| curvature radius | air interval | refraction ratio | Abbe number |
|---|---|---|---|
| $R_1 = 0.290$ | $d_1 = 0.0644$ | $n_1 = 1.776$ | $v_1 = 49.9$ |
| $R_2 = 1.134$ | $d_2 = 0.0276$ | | |
| $R_3 = \infty$ | $d_3 = 0.0069$ | | |
| $R_4 = -2.368$ | $d_4 = 0.0248$ | $n_4 = 1.680$ | $v_2 = 30.0$ |
| $R_5 = 0.275$ | $d_5 = 0.0941$ | | |
| $R_6 = 0.705$ | $d_6 = 0.0891$ | $n_6 = 1.808$ | $v_6 = 46.7$ |
| $R_7 = -0.705$ | $d_7 = 0.1427$ | | |
| $R_8 = -0.407$ | $d_8 = 0.0297$ | $n_8 = 1.543$ | $v_8 = 47.4$ |
| $R_9 = 1.338$ | $d_9 = 0.2822$ | | |
| $R_{10} = 1.048$ | $d_{10} = 0.1485$ | $n_{10} = 1.519$ | $v_{10} = 64.4$ |
| $R_{11} = \infty$ | $d_{11} = 0.0020$ | | |
| $R_{12} = 1.048$ | $d_{12} = 0.1485$ | $n_{12} = 1.519$ | $v_{12} = 64.4$ |
| $R_{13} = \infty$ | | | |

The aberration characteristics of the projection optical systems for a liquid crystal projector according to the first and second embodiments of the present invention are represented in FIGS. 5 and 6, respectively.

In the projection optical system for a liquid crystal projector according to the present invention, the effective focal length is assumed equal to one, and thus, when the normalized power of the overall optical system is one, the power of front lens portion 131 is about 0.70 and that of rear lens portion 132 is about 0.97. Accordingly, there is a greater power concentration for rear lens portion 132. On the other hand, for the length of front lens portion 131 to be shortened, the power of the fourth lens is strongly maintained at −1.76 so that only the front lens portion 131 has a telecentric configuration.

Selecting smaller magnification ratios for rear lens portion 132 than those suggested by the embodiments (Tables 1 and 2) does not affect resolution capability. However, as the power of rear lens portion 132 is reduced, the distance between front lens portion 131 and rear lens portion 132 should be much larger in order to maintain the telecentric characteristics. Accordingly, to maintain an overall length of the optical system (i.e., $d_1+d_2+d_3+d_4+d_5+d_6+d_7+d_{8+a9}+d_{10}+d_{11}+d_{12}+d_{13}$) ranging from the first lens to fan image plane 110 to be less than 1.3 times the effective focal length, the power of rear lens portion 132 should be greater than 80 percent of the overall optical power.

On the other hand, when the power of rear lens portion 132 is greater than 130 percent of the overall power, the Petzval sum and the color aberration are excessive, which impedes the aberration compensation of front lens portion 131.

As for front lens portion 131, first, second and third lenses are conventional triplet lenses and coupled in series as a plano-convex lens, a concave lens and a convex lens. Also, the fourth lens serves to compensate the Petzval sum of the front and rear lens portions. The Petzval sum due to the first and third lenses having positive vergences is mainly compensated at the lens surfaces having curvature radii $R_5$ and $R_8$. Here, the color aberration produced by the first and third lenses is mainly compensated by the fourth lens.

For the purpose of smaller lens diameters as a whole, stop 120 is located between the lens surfaces having curvature radii $R_2$ and $R_4$. If stop 120 is placed between the lens surfaces having curvature radii $R_5$ and $R_6$, the first and fourth lenses should have larger diameters in order to maintain a constant illumination applied for the lens arrangement, as well as to maintain the inter-lens distances on the input side of stop 120.

Experimentation has shown that the projection optical system according to the present invention provides improved focusing results for larger projection angles than the conventional one. In the case of a 1.00 field, the ambient illumination is still maintained above 48 percent and the effective radii of the first and fourth lenses can be reduced to below 50 percent. Therefore, the lens material and manufacturing cost savings can be realized.

As described above, the projection optical system for a liquid crystal projector according to the present invention is a more compact optical system wherein the total lens length is less than 125 percent of the effective focal length, thereby reducing manufacturing costs. Furthermore, a low-refractional, low-dispersional, inexpensive material (for example, BK-7) may be preferably used for the convex lenses of the rear lens portion so that the material cost can be reduced. Additionally, such a projection optical system shows an improved image formation characteristic even in unfavorable conditions, in which the displayed image angle is much larger than that of the prior art.

What is claimed is:

1. A projection optical system for a liquid crystal projector comprising:

a front lens portion having a meniscus lens, a first bi-concave lens, a bi-convex lens and a second bi-concave lens sequentially arranged from the furthermost part of an image plane; and a rear lens portion consisting of two plano-convex lenses positioned between said from lens portion and image plane, with the flat surfaces of said plano-convex lenses facing said image plane.

2. The projection optical system for a liquid crystal projector as claimed in claim 1, further comprising a stop between said meniscus lens and said first bi-concave lens in said front lens portion, said stop placed adjacent to said first bi-concave lens.

3. The projection optical system for a liquid crystal projector as claimed in claim 1, wherein said lenses satisfy the following relationships:

(1) $f/1.3 \leq f_{back} < f/0.8$
   (2) $f/2.0 \leq |f_4| < f/1.4$
   (3) $n_6 > 1.75$
   (4) $n_{10} < 1.55$
   (5) $n_{12} < 1.55$
   (6) $v_{10} > 60$
   (7) $v_{12} > 60$
   (8) $0.8 \leq R_5/R_1 < 1.2$ where f is the focal length of the overall projection optical system, $f_{back}$ is the focal length of said rear lens portion, $f_4$ is the focal length of said second bi-concave lens, $n_6$ is the refraction ratio of the surface of said bi-convex lens which faces away from said image plane, $n_{10}$ and $n_{12}$ are the refraction ratios of the respective convex surfaces of said plano-convex lenses, $v_{10}$ and $v_{12}$ are the Abbe numbers for the convex surfaces of said plano-convex lenses, $R_1$ is the curvature radius of the surface of said meniscus lens which faces away from said image plane, and $R_5$ is the curvature radius of the surface of said first bi-concave lens which faces towards said image plane.

4. The projection optical system for a liquid crystal projector as, claimed in claim 1, wherein the power of said rear lens portion is more than 85 percent of the power of the overall optical system.

5. The projection optical system for a liquid crystal projector as claimed in claim 4, wherein the sum of the length of said projection optical system and distance from said projection optical system to said image plane is less than 130 percent of the effective focal length of said projection optical system.

6. The projection optical system for a liquid crystal projector as claimed in claim 1, wherein the focusing operation is performed by adjusting the distance between said rear lens portion and said front lens portion.

* * * * *

UNITED STATES PATENT AND TRADEMARK OFFICE
CERTIFICATE OF CORRECTION

PATENT NO. : 5,539,580
DATED : July 23, 1996
INVENTOR(S) : Hoo-shik Kim

It is certified that error appears in the above-indentified patent and that said Letters Patent is hereby corrected as shown below:

In claim 1, column 6, line 37, after "positioned between said", delete "from" and add --front--.

Signed and Sealed this

First Day of October, 1996

Attest:

BRUCE LEHMAN

Attesting Officer     Commissioner of Patents and Trademarks